US010537059B2

(12) United States Patent
Muellenbach et al.

(10) Patent No.: US 10,537,059 B2
(45) Date of Patent: Jan. 21, 2020

(54) GANG MOWER WITH CUTTING UNITS HAVING SUSPENSIONS INCORPORATING TUNED MASS DAMPERS

(71) Applicant: The Toro Company, Bloomington, MN (US)

(72) Inventors: Corey J. Muellenbach, Cottage Grove, MN (US); David W. Johnson, Hastings, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 15/694,778

(22) Filed: Sep. 2, 2017

(65) Prior Publication Data
US 2019/0069477 A1 Mar. 7, 2019

(51) Int. Cl.
*A01D 34/53* (2006.01)
*A01D 34/62* (2006.01)
*A01D 34/44* (2006.01)
*A01D 101/00* (2006.01)
*A01D 34/54* (2006.01)

(52) U.S. Cl.
CPC ............. *A01D 34/62* (2013.01); *A01D 34/44* (2013.01); *A01D 34/53* (2013.01); *A01D 34/54* (2013.01); *A01D 2101/00* (2013.01)

(58) Field of Classification Search
CPC ........ A01D 34/62; A01D 34/44; A01D 34/53; A01D 34/54; A01D 34/43; A01D 43/063; A01D 73/042; A01D 75/30; A01D 75/306; F16F 1/387; F16F 7/108; F16F 7/1022; F16F 15/1442
USPC ................. 56/6, 7, 12.6, 156, 249, 294, 306
See application file for complete search history.

(56) References Cited

U.S. PATENT DOCUMENTS

| 6,044,631 | A * | 4/2000 | Anderson | A01B 73/042 56/249 |
| 6,412,258 | B1 * | 7/2002 | Doerflinger | A01D 75/306 56/14.9 |
| 7,669,397 | B1 * | 3/2010 | Goman | A01D 34/62 56/12.6 |
| 8,544,251 | B2 * | 10/2013 | Goman | A01D 34/44 56/249 |
| 2003/0177746 | A1 * | 9/2003 | Goman | A01D 34/62 56/7 |

* cited by examiner

*Primary Examiner* — Robert E Pezzuto
(74) *Attorney, Agent, or Firm* — James W. Miller (57) ABSTRACT

A mower includes a plurality of grass cutting units, either reel or rotary, arranged in a gang configuration. Each cutting unit is connected to the mower by a separate suspension that includes a lift and lower portion for lifting and lowering the cutting unit out of and into contact with the ground, respectively. The suspension includes a ground contour following portion permitting the cutting unit to have one or more degrees of freedom relative to the lift and lower portion to independently follow the ground contours the cutting unit encounters. A tuned mass damper is installed in the ground contour following portion of the suspension or is adjacent to a connection between the ground contour following portion and the lift and lower portion for damping undesired vertical bobbing of the cutting unit.

20 Claims, 7 Drawing Sheets

GANG MOWER WITH CUTTING UNITS HAVING SUSPENSIONS INCORPORATING TUNED MASS DAMPERS

TECHNICAL FIELD

This invention relates generally to riding mowers and, more particularly, to riding mowers having a plurality of cutting units arranged in a gang configuration to cut a swath of grass that is wider than the swath cut by any individual cutting unit.

BACKGROUND OF THE INVENTION

Riding mowers are well known for cutting relatively wide swaths of grass in a single pass of the mower. Such mowers typically carry a plurality of individual cutting units disposed in a gang configuration in which the cutting units are staggered relative to one another. Any uncut strips of grass that would be left or are left by the cutting units in a given row are overlapped and cut by the cutting units in a preceding or trailing row. In one type of gang riding mower, the cutting units are reel cutting units having cutting reels that rotate about horizontal axes to push uncut grass against bedknives to cut the grass in a shearing action. In another type of gang riding mower, the cutting units are rotary cutting decks having one or more blades that rotate in horizontal planes about vertical axes to cut the grass by impact with sharpened cutting edges on the blades.

The cutting units in gang mowers are typically attached to the frame of the mower by suspensions that perform two functions. The suspension has a first portion that lifts and lowers the cutting units into and out of contact with the ground. This first suspension portion allows the cutting units to be lifted above the ground in a transport mode of operation or to be lowered into contact with the ground in a cutting mode of operation. The first suspension portion further allows the operator to lift the cutting units above the ground at the end of a cutting pass, to turn the mower around with the cutting units held above the ground during the turnaround, and to then lower the cutting units back into contact with the ground at the beginning of the next cutting pass. A second portion of the suspension provides the cutting units with a ground contour following ability that permits each cutting unit to adjust itself to the ground contours that it encounters in the cutting mode of operation.

When gang mowers are used to cut grass, it has been observed in the past that the cutting units sometimes exhibit a harmonic up and down vertical motion, which shall be referred to as a bobbing motion, as the mower is moving forwardly to cut grass. This bobbing motion is most often observed on reel cutting units, but rotary cutting decks are not immune to this problem. Such a bobbing motion can decrease the quality of cut as the grass height can vary slightly within the cut swath due to the bobbing motion of the cutting units. This height variation is particularly unacceptable in reel cutting units which are designed to cut grass more precisely than rotary cutting decks and at generally lower heights of cut than rotary cutting decks.

The Toro Company, the assignee of this invention, has in the past addressed this problem by adding tuned mass dampers to reel cutting units to decrease the magnitude of such bobbing motion. U.S. Pat. No. 7,669,397 is owned by The Toro Company and relates to using tuned mass dampers within the ground engaging rollers of a reel cutting unit. While this is effective in decreasing the amplitude of the bobbing motion, the amount of the decrease is limited by the relatively small size of the mass damper that can be packaged within the roller of a reel cutting unit. In addition, U.S. Pat. No. 7,934,364 is also owned by The Toro Company and relates to tuned mass dampers that are attached to the frame of the reel cutting unit. However, the size of such mass dampers and where such mass dampers can be placed on the frame of the reel cutting unit are also similarly constrained due to operational clearance that must be maintained between the reel cutting units and their respective suspensions.

SUMMARY OF THE INVENTION

One aspect of this invention relates to a mower which comprises a plurality of grass cutting units arranged in a gang configuration on a movable frame. The grass cutting units are reel cutting units or rotary cutting decks. A separate suspension carries each grass cutting unit and separately connects each grass cutting unit to the frame. Each suspension includes a lift and lower portion for lifting and lowering the cutting unit out of and into contact with the ground, respectively. Each suspension also includes a ground contour following portion permitting the cutting unit to have at least one degree of freedom relative to the lift and lower portion to permit the cutting unit to independently follow the ground contours the cutting unit encounters in a grass cutting mode of operation. At least one tuned mass damper is installed in each suspension adjacent a connection between the ground contour following suspension portion and the lift and lower suspension portion for damping undesired vertical bobbing of the cutting unit.

Another aspect of this invention relates to a mower which comprises a frame supported for movement over the ground by a plurality of wheels. At least one of the wheels is powered by a prime mover carried on the frame for causing the frame to be self-propelled. The frame has a support for carrying an operator thereon during a grass mowing operation. A plurality of grass cutting units are carried on the frame in a gang configuration such that the cutting units collectively cut a swath of grass that is wider than a swath of grass cut by any one cutting unit. A plurality of suspensions extends between the frame and the cutting units for connecting the cutting units to the frame such that the cutting units are propelled over the ground by the self-propulsion of the frame over the ground. One suspension is provided for each cutting unit. Each suspension comprises a pivotal lift and lower suspension portion attached to the frame for raising the cutting unit above the ground to place the cutting unit into a transport position in which the frame may be driven from place to place without cutting grass and for lowering the cutting unit into contact with the ground to permit the cutting unit to cut grass in the grass mowing operation. Each suspension further comprises a ground contour following suspension portion connecting the lift and lower suspension portion to the cutting unit to permit the cutting unit to move relative to the lift and lower suspension portion to adapt to ground contours independently of the frame. A mass damper is attached to and is movably carried by each suspension for vertical upward and downward motion relative to each suspension. The mass damper motion is counter to and damps an upward and downward harmonic bobbing motion of the cutting unit experienced by the cutting unit during the grass mowing operation.

Yet another aspect of this invention relates to a mower carrying a plurality of grass cutting units arranged in a gang configuration on a movable frame. The grass cutting units are reel cutting units or rotary cutting decks. A separate suspension carries each grass cutting unit and separately connects each grass cutting unit to the frame. Each suspension includes a lift and lower portion for lifting and lowering the cutting unit out of and into contact with the ground, respectively, and a ground contour following portion to permit the cutting unit to independently follow the ground contours the cutting unit encounters in a grass cutting mode of operation. The ground contour following suspension portion includes a pair of laterally spaced pitch arms having hubs that are pivotally journalled on laterally spaced cylindrical members on the grass cutting unit to permit the cutting unit to pivot or rock about a substantially horizontal, laterally extending pitch axis. A radial clearance between each pitch arm and the cylindrical member bearing which journals each pitch arm is approximately ten thousandths of an inch or less. At least one tuned mass damper is installed in each suspension for damping undesired vertical bobbing of the cutting unit.

BRIEF DESCRIPTION OF THE DRAWINGS

This invention will be described more fully in the Detailed Description, when taken in conjunction with the following drawings, in which like reference numerals refer to like elements throughout.

DETAILED DESCRIPTION

Figure 1:
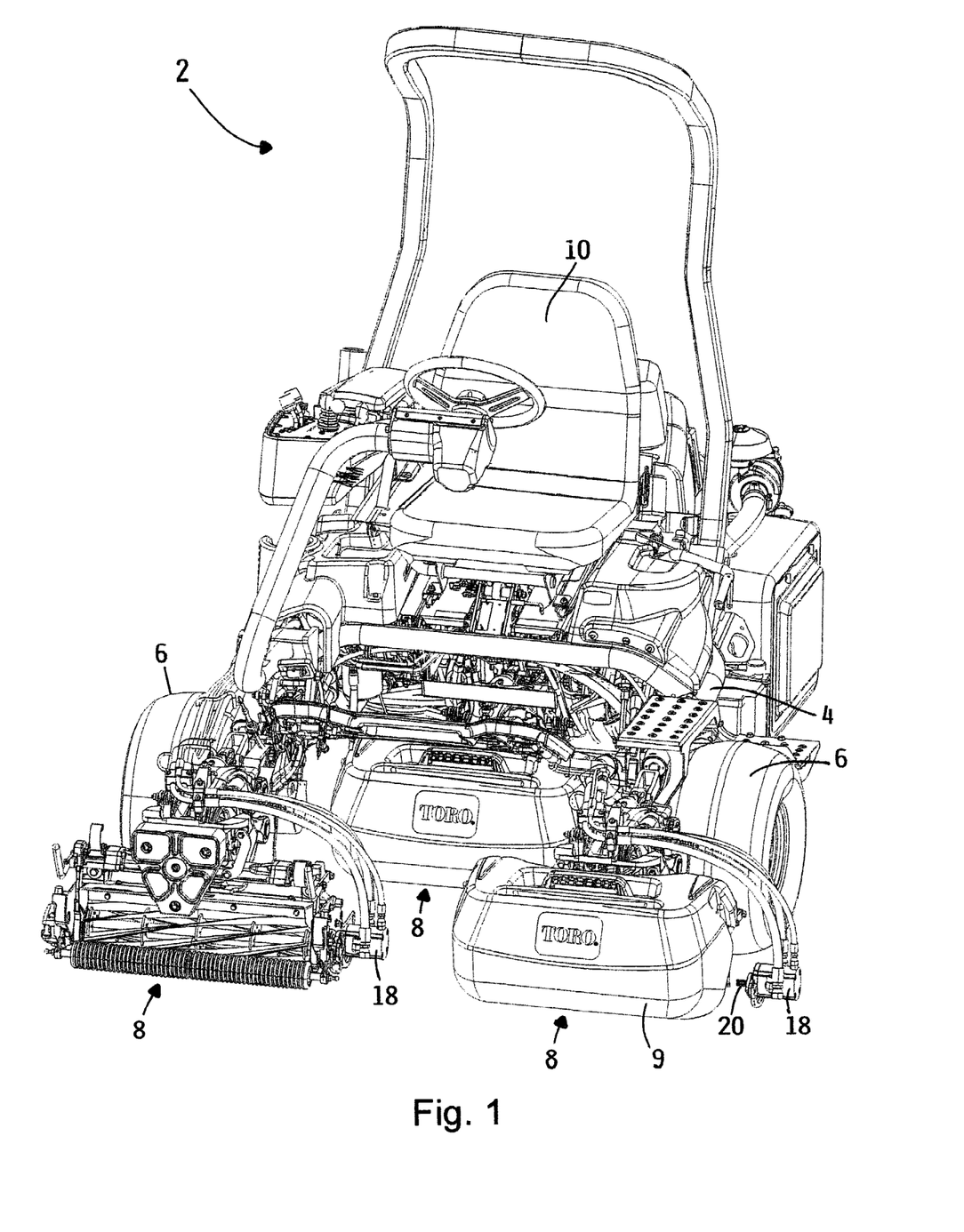
FIG. 1 is a perspective view of one embodiment of a riding mower according to this invention.

One embodiment of this invention is illustrated on a riding mower 2 as shown in FIG. 1. Mower 2 is of the type disclosed in U.S. Pat. No. 8,544,251, owned by the assignee of this invention, The Toro Company. U.S. Pat. No. 8,544,251 is hereby incorporated by reference herein.

Mower 2 has a frame 4 supported for rolling over the ground by a pair of front drive wheels 6 and one or more steerable rear wheels (not shown). Frame 4 carries a prime mover of any suitable type at the rear of frame 4. The prime mover supplies power to rotate drive wheels 6 through any suitable traction drive system (not shown) to self-propel frame 4 over the ground and for operating a plurality of cutting units 8 carried on frame 4. In the embodiment of mower 2 shown in FIG. 1, cutting units 8 comprise reel cutting units some of which are shown have grass collecting baskets 9 attached thereto. In other embodiments of mower 2 according to this invention, cutting units 8 may comprise rotary cutting decks. Mower 2 is operated by an operator who is carried in a seat 10 on frame 4 or who, in other embodiments, may be carried on frame 4 in a standing position atop a stand-on platform.

Cutting units 8, whether reel or rotary, are carried on frame 4 in a gang configuration such that they collectively cut a swath of grass that is wider than the swath of grass cut by any individual cutting unit 8. In such a gang configuration, some cutting units will be disposed forwardly of other cutting units, some cutting units will be disposed in one or more lateral rows but will be separated laterally from one another so as to otherwise leave a strip or strips of uncut grass between them, and other preceding or trailing cutting units will be laterally staggered to cover and cut any such strips of uncut grass. For example, in the triplex gang configuration in the illustrative mower of FIG. 1, two front cutting units 8 are separated laterally from one another with the gap between them being covered by a single, center, trailing rear cutting unit 8. Thus, during a single pass of mower 2, a single substantially unbroken swath of grass is collectively cut by all three cutting units 8. Gang mowers having more than three cutting units are also possible and the gang arrangement of cutting units 8 on frame 4 of mower 2 may vary.

Figure 2:
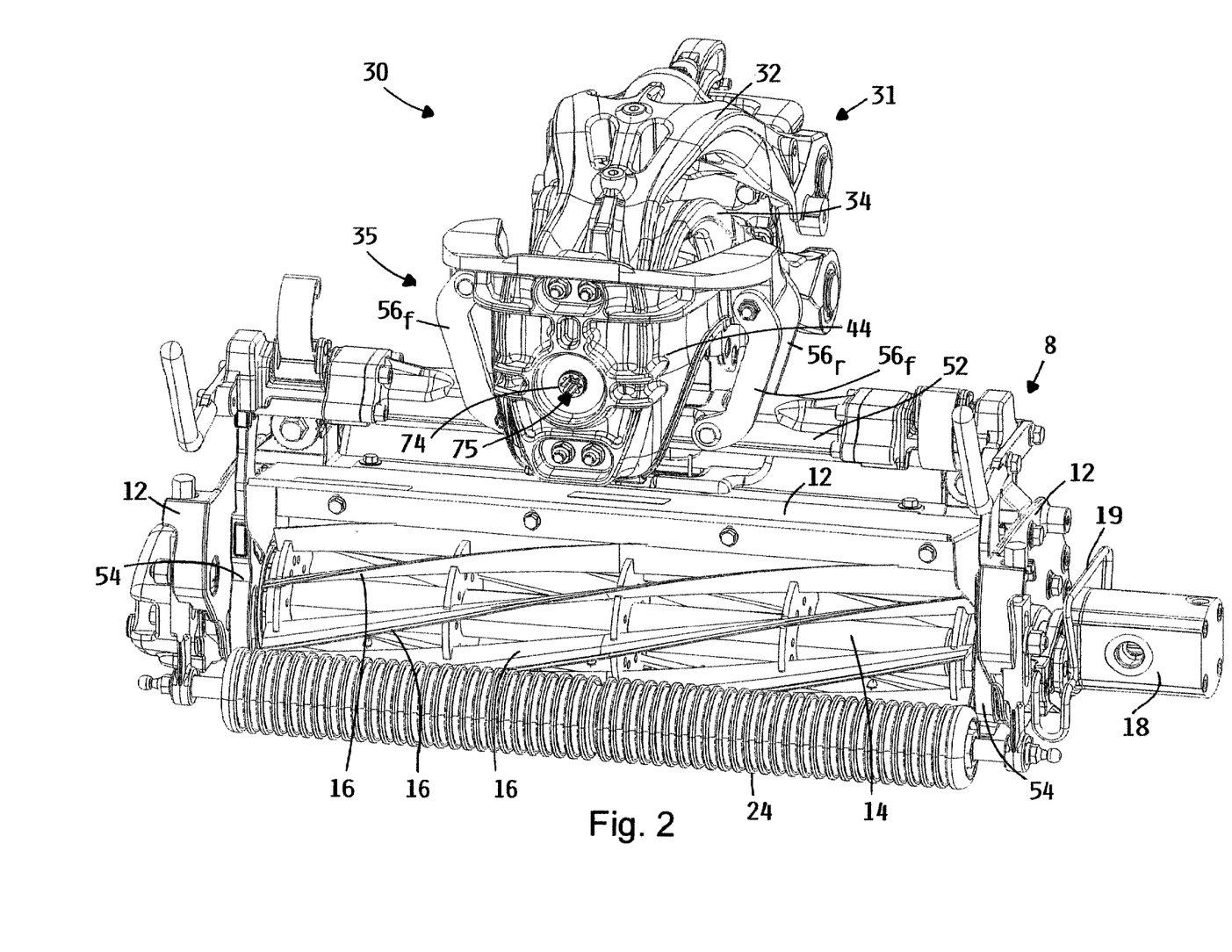
FIG. 2 is a perspective view of one of the reel cutting units that are used on the embodiment of the mower shown in FIG. 1, particularly illustrating the cutting unit without the tuned mass damper of this invention installed thereon.
Figure 3:
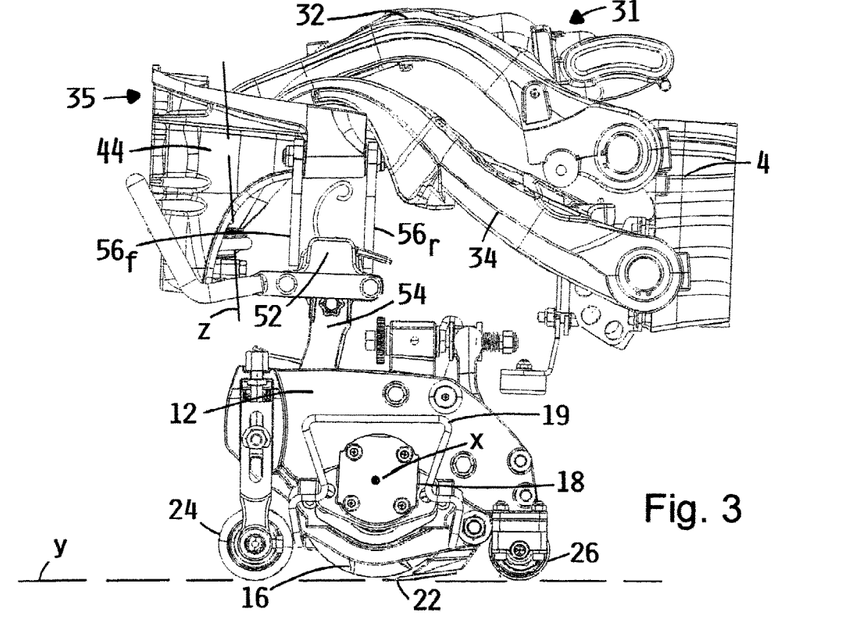
FIGS. 3 and 4 are side and front elevational views, respectively, of the suspension of the cutting unit of FIG. 2, particularly illustrating the lift and lower portion of the suspension and the ground contour following portion of the suspension that permits the cutting unit of FIG. 2 to have three degrees of motion relative to the lift and lower portion of the suspension.
Figure 4:
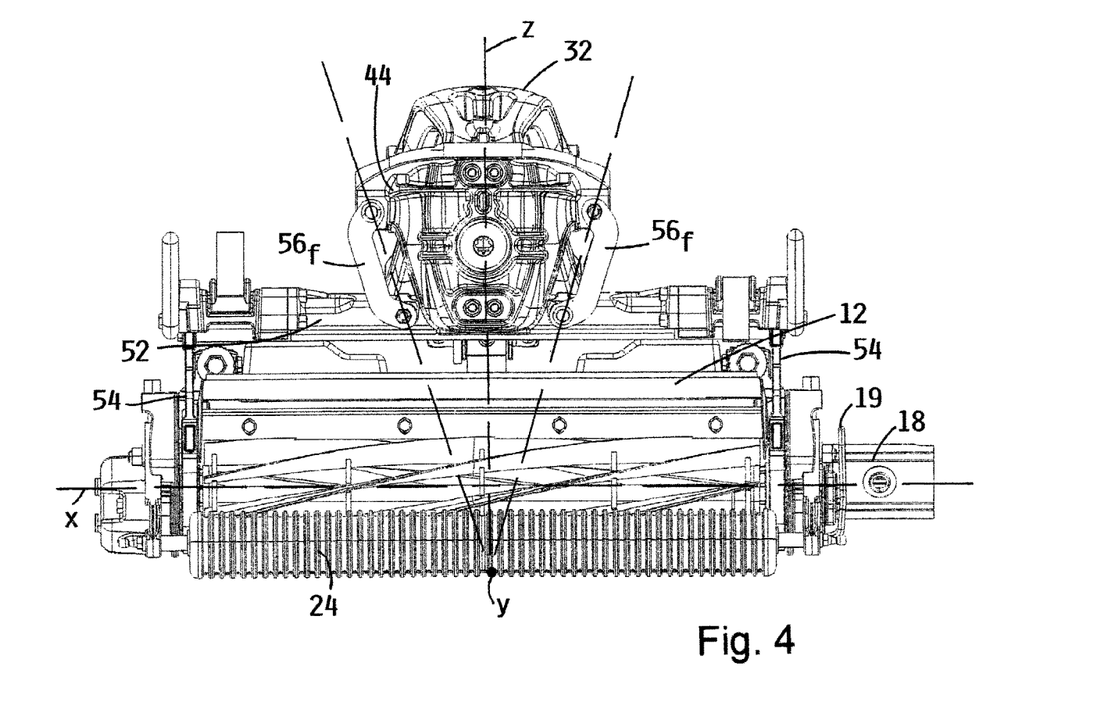

As further described in the '251 patent which is incorporated by reference herein, and referring now to FIGS. 2-4 hereof, each cutting unit 8 has its own frame 12 that rotatably journals a reel 14 for rotation about a horizontal axis x. Reel 14 carries a plurality of circumferentially spaced, helical blades 16. Reel 14 is rotated by a motor 18, e.g. by a hydraulic motor as shown in FIG. 1 but alternatively by an electric motor, having a splined drive shaft 20 that connects to the shaft of reel 14. Motor 18 has a quick release connection to cutting unit frame 12 using a pivotal wire form 19 that clamps motor 18 in place to permit easy and quick attachment and removal of motor 18 from cutting unit 8 without the need for tools. When reel 14 is rotated by motor 18 during operation of mower 2, the blades of reel 14 sweep uncut grass against a sharpened bedknife 22 to cut the grass in a shearing action between reel 14 and bedknife 22. Cutting unit frame 12 has rotatable a front roller 24 and rear roller 26 for allowing cutting unit 8 to be independently supported for rolling over the ground.

Each cutting unit 8 is coupled to frame 4 of mower 2 by its own suspension 30, which is also set forth in more detail in the '251 patent. Suspension 30 includes a lift and lower portion 31 comprising an upper A-shaped suspension arm 32 and an underlying lower A-shaped suspension arm 34. Upper and lower suspension arms 32, 34 are pivotally connected to frame 4 of mower 2 at their rear ends to allow suspension arms 32, 34 to pivot up and down relative to frame 4 to lift and lower cutting unit 8 into and out of contact with the ground. A lift and lower actuator (not shown), such as but not limited to a hydraulic cylinder, is connected to upper suspension arm 32 to achieve the lift and lower function under the control of the operator.

In addition, suspension 30 includes a second portion, namely a ground contour following portion 35, which is interposed between lift and lower suspension portion 31 and cutting unit frame 12 to permit cutting unit 8 to move in three degrees of freedom. Ground contour following suspension portion 35 includes a cast aluminum steering head 44 that is journalled by coaxially aligned ball joints on the front ends of the upper and lower suspension arms 32, 34 to allow steering head 44 to yaw about a substantially vertical yaw axis z. Steering head 44 has inclined links $56_f$ and $56_r$ that support a carrier frame 52 for cutting unit 8. Links 56 converge at a virtual, longitudinal, horizontal roll axis y as best shown in FIGS. 3 and 4. Carrier frame 52 includes a pair of downwardly extending pitch arms 54, 54 that are journalled on cutting unit frame 12 about the axis of rotatable reel 14 to establish a horizontal pitch axis that is the same as the rotational axis x of reel 14. The location of the x pitch axis, the y roll axis, and the z yaw axis are all depicted in FIGS. 3 and 4. More details of suspension 30 and the three degrees of motion it provides for cutting unit 8 are set forth in the '251 patent, which has been incorporated by reference herein.

Figure 9:
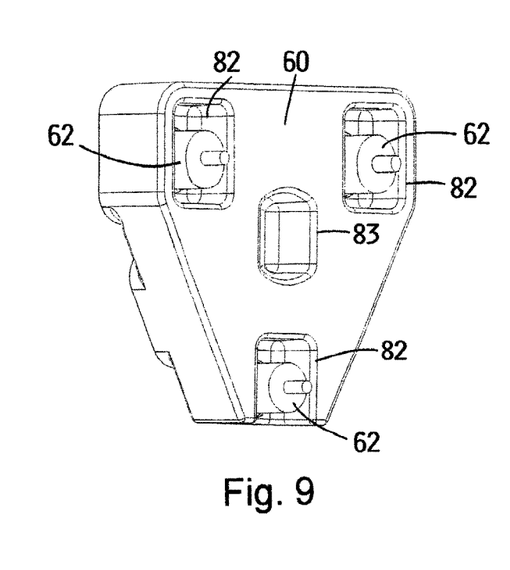
FIG. 9 is a perspective view of a back of the tuned mass damper of FIGS. 5-8.

Turning now to FIGS. 5-10, suspension 30 of each cutting unit 8 incorporates a tuned mass damper 60. As best shown in FIG. 9, mass damper 60 comprises an autonomous body which provides an additional movable weight or mass in each suspension. Mass damper 60 is connected to a portion of suspension 30 in a manner such that mass damper 60 moves independently relative to suspension 30 and relative to cutting unit 8 in a counter motion that damps or lessens any harmonic up and down bobbing of cutting unit 8 experienced by cutting unit 8 during a grass mowing operation. This will improve the quality of cut provided by each cutting unit 8 to improve the appearance of the cut grass swath that is collectively left by all the cutting units 8. Each suspension 30 for each cutting unit 8 carried by frame 4 of mower 2 preferably carries its own mass damper 60.

Figure 5:
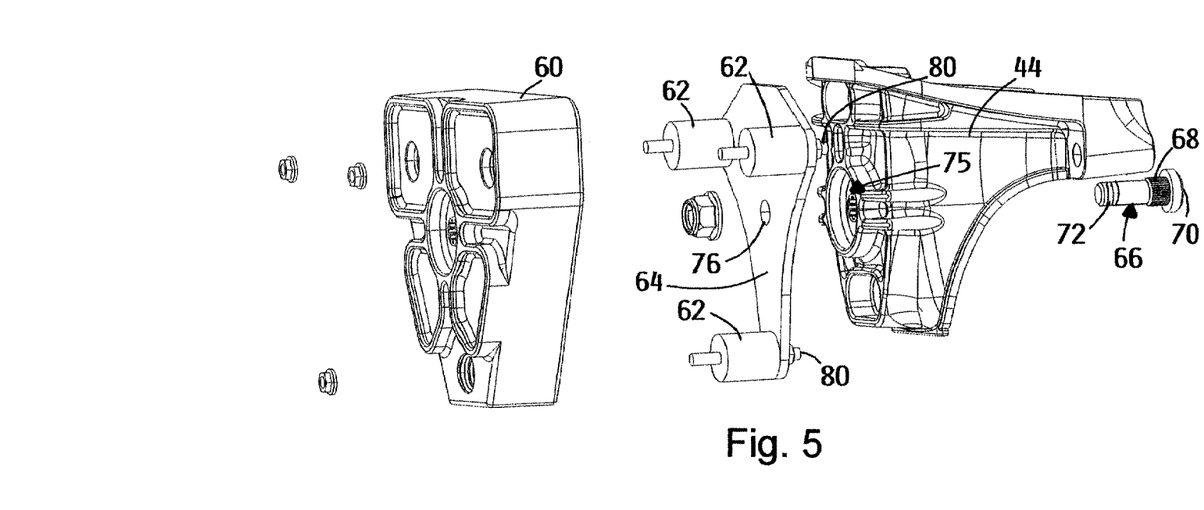
FIGS. 5-8 are exploded perspective views of a tuned mass damper according to one embodiment of this invention, particularly illustrating an exemplary set of steps for attaching the tuned mass damper to a steering head in the ground contour following portion of the suspension.
Figure 6:
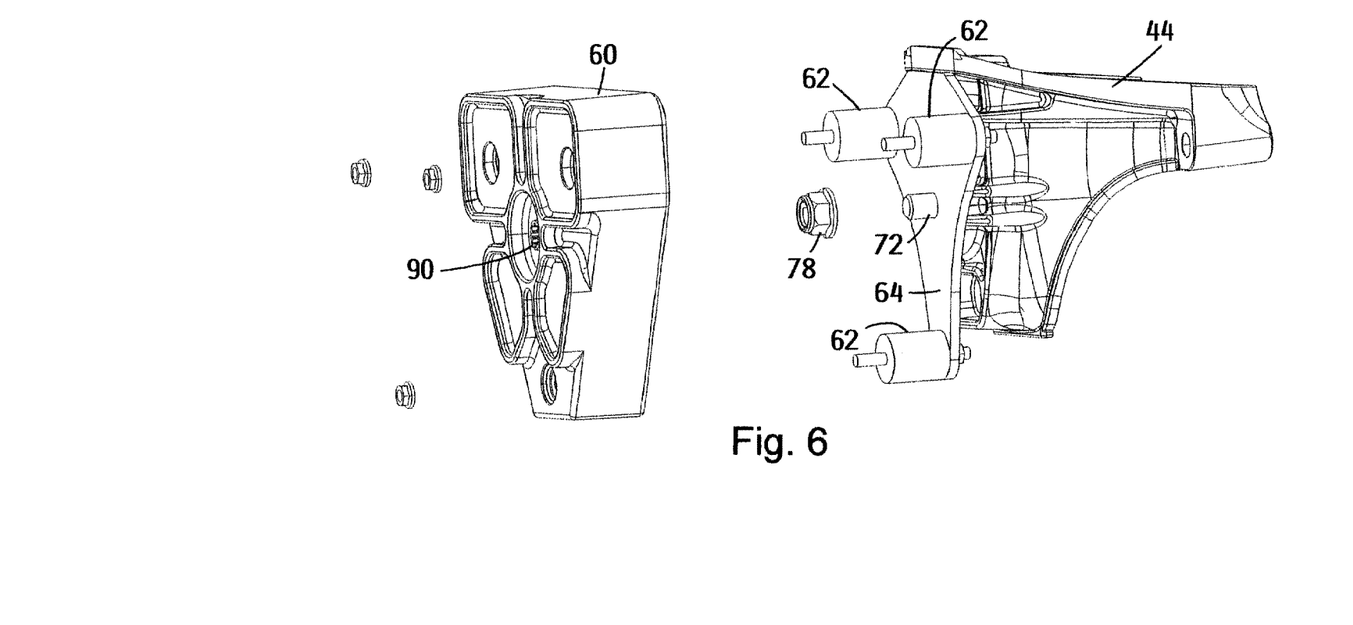
Figure 10:
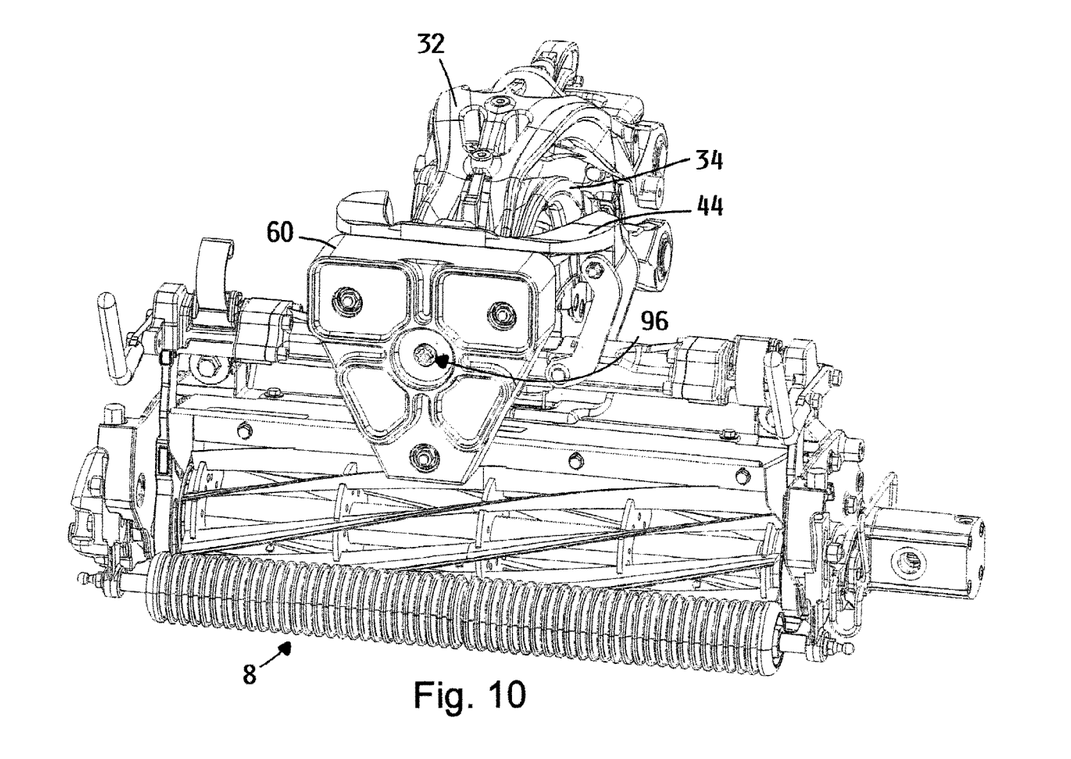
FIG. 10 is a perspective view similar to FIG. 2 of one of the reel cutting units of the mower of FIG. 1, particularly illustrating the tuned mass damper of FIGS. 5-9 installed thereon.

Referring to FIG. 5, mass damper 60 is preferably, but not necessarily, attached to the front face of steering head 44 of ground contour following suspension portion 35. In the embodiment of mass damper 60 disclosed herein, mass damper 60 has a shape that substantially conforms to the shape of steering head 44. Thus, as shown in FIG. 10, when mass damper 60 is attached to steering head 44, mass damper 60 extends forwardly from steering head 44 and forms what appears to be a continuation of steering head 44. However, this need not necessarily be the case. Mass damper 60 could have any shape including a shape that is different from that of steering head 44.

Mass damper 60 is resiliently and movably attached to the front face of steering head 44 by a plurality of elastomeric couplers 62 and a coupling plate 64. Coupling plate 64 has a shape that allows coupling plate 64 to be sandwiched between the front face of steering head 44 and the rear face of mass damper 60 to be substantially hidden between the two when the attachment of mass damper 60 to steering head 44 is completed. Coupling plate 64 is bolted to the front face of steering head 44 using a bolt 66. Bolt 66 has a shank with a splined portion 68 adjacent the head 70 of bolt 66 and a threaded portion 72 adjacent the free end of bolt 66.

Figures 11, 12:
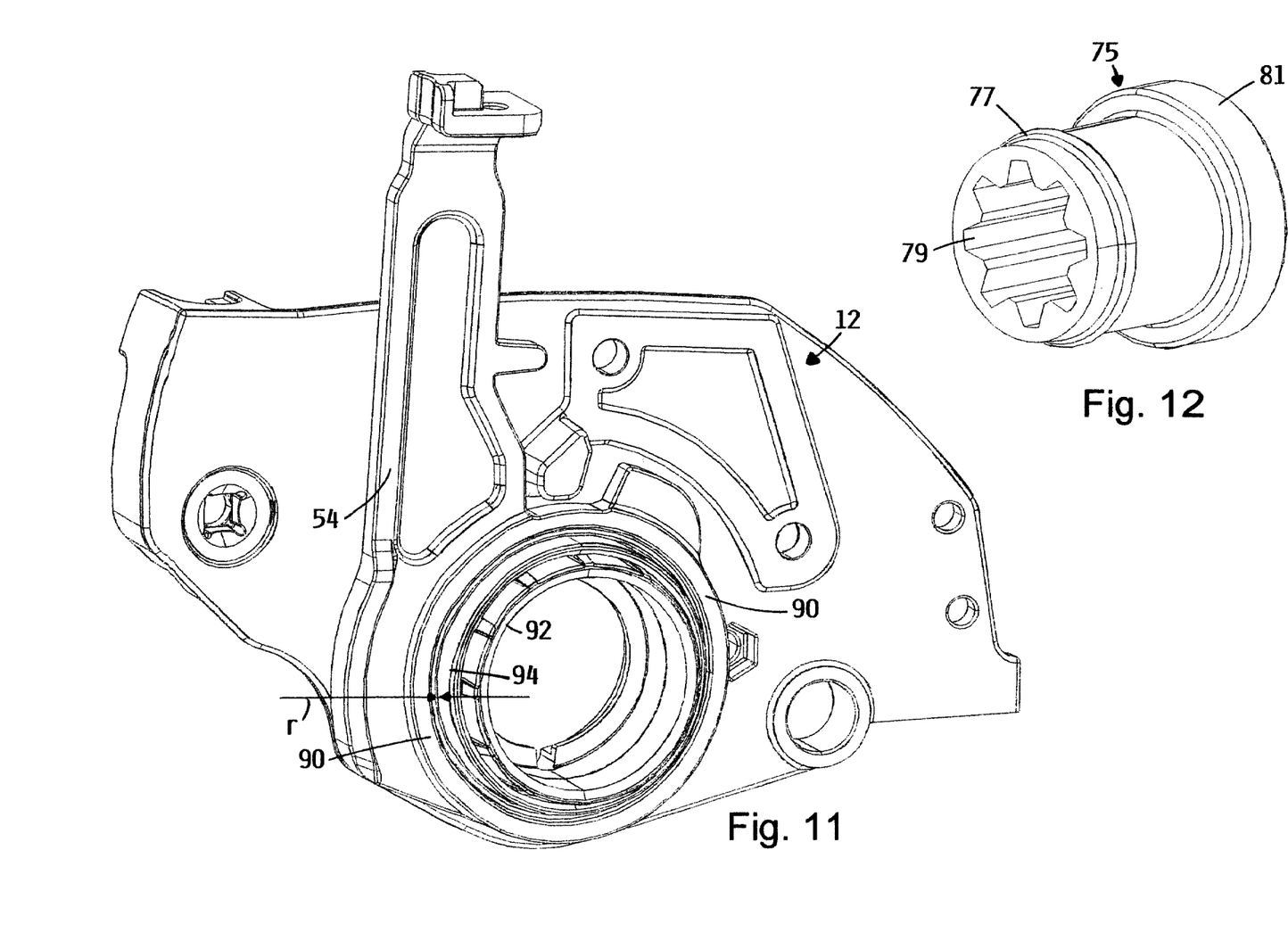
FIG. 11 is a perspective view of one pitch arm of the ground contour following portion of the suspension, particularly illustrating how such pitch arm is journalled around a bearing on a side plate of one of the reel cutting units of the mower of FIG. 1.
FIG. 12 is a perspective view of a splined insert that is used both in the steering head of the ground contour following portion of the suspension and in the tuned mass damper that may be attached to the steering head.

As best shown in FIG. 2, the front face of steering head 44 has a central bore 74. A cylindrical plastic insert 75, as depicted in FIG. 12, is designed to be pushed or tapped by a hammer forwardly through central bore 74 of steering head 44 from behind the front face of steering head 44. As insert 75 reaches the point of full insertion within bore 74, an annular, outwardly extending ring 77 at the front of insert 75 snaps into place against the front face of steering head 44 while an enlarged annular head 81 at the rear of insert 75 engages against a rearwardly facing surface of steering head 44 to keep insert 75 assembled within bore 74. Insert 75 has a splined inner diameter 79 that provides for temporary storage of motor 18 as will be described hereafter. The splined portion 68 of bolt 66 has splines that are not designed to match the splined inner diameter 79 of insert 75, but to have an interference fit with inner diameter 79. When bolt 66 is pushed through insert 75, the splined portion 68 of bolt 66 cuts itself into insert 75 such that bolt 68 and insert 75 are thereafter locked together.

The assignee of this invention, The Toro Company, has made and sold a prior art mower known as the TriFlex Riding Greensmower. In mower 2 herein and in the prior art TriFlex mower, cutting units 8 can be easily removed from mower 2 and rolled away from mower 2 for service and/or replacement and then quickly and easily reinstalled thereon. This removal and reinstallation is described in detail in the '251 patent incorporated by reference herein.

In order to remove cutting units 8, the quick attachment of motor 18 to cutting unit 8 is released by pivoting wire form 19 to a position in which motor 18 is no longer clamped against the side plate of the reel cutting unit 8 and thus can be disengaged. Motor 18 is then slid out of its splined drive connection to the shaft of reel 14 without having to remove the hydraulic hoses leading to motor 18. Motor 18 is then lifted up and is temporarily stored on the front face of steering head 44 by inserting the splined drive shaft 20 of motor 18 into the splined inner diameter 79 of insert 75 on steering head 44. The splines on drive shaft 20 and the splines on inner diameter 79 are designed to mate. This serves as a convenient way to keep motor 18 attached to cutting unit 8 in an out of the way and secure location while awaiting reinstallation of cutting unit 8.

Figure 7:
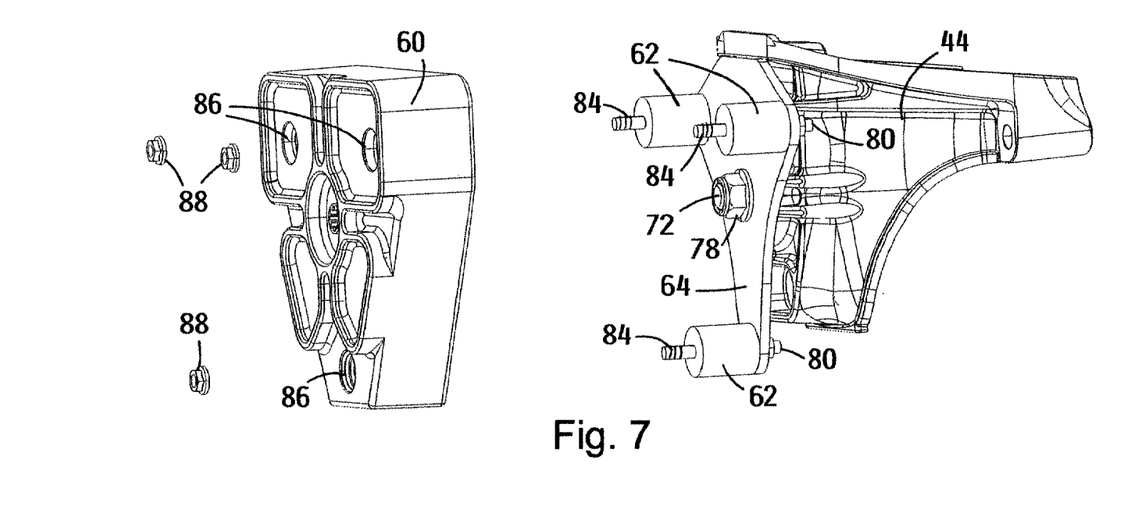
Figure 8:
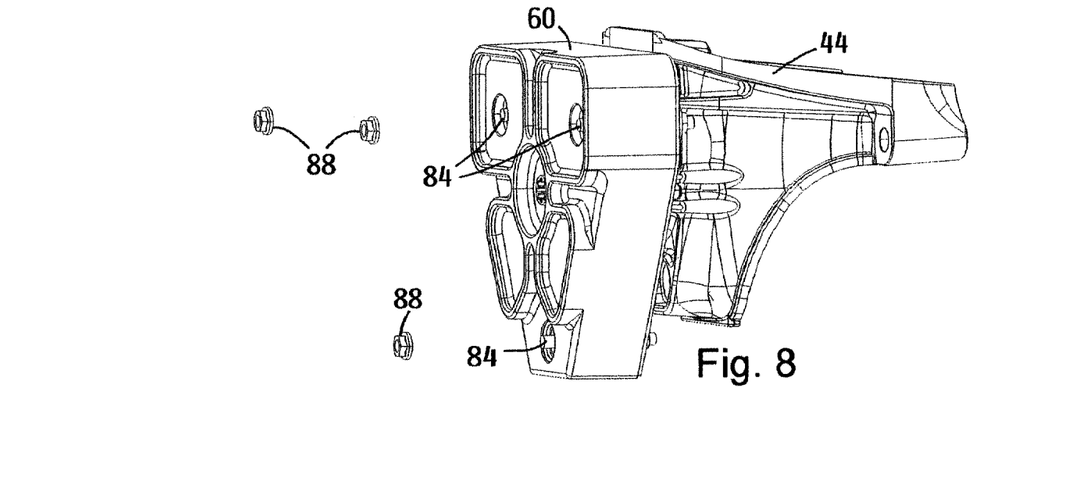

Bolt 66 can be inserted through insert 75 of central bore 74 by pushing the free end of bolt 66 forwardly through central bore 74 from behind the front face of steering head 44. Then, coupling plate 64 can be installed on bolt 66 by passing the free end of bolt 66 through a central opening 76 on coupling plate 64 and then pushing coupling plate 64 up against the front face of steering head 44. See FIG. 6. Coupling plate 64 can then be firmly clamped in place on steering head 44 by threading a nut 78 onto the threaded free end 72 of bolt 66 and tightening nut 78 as shown in FIG. 7. Coupling plate 64 then serves as the member to which a plurality of the elastomeric couplers 62 are bolted by threaded shafts 80 extending from rear faces of couplers 62.

Mass damper 60 is then attached to coupling plate 64 using couplers 62. Referring to FIG. 9, mass damper 60 is preferably a cast metal piece, such as cast grey iron, having a plurality of vertically oversized pockets 82 opening into the back face of mass damper 62 and extending forwardly therefrom through a substantial portion of the front to back thickness of mass damper 60. Each coupler 62, which may be cylindrical in shape but need not necessarily be cylindrical, is sized to fit within one of the pockets 82 with room to spare above and below coupler 62. As cutting unit 8 bobs up and down during a grass mowing operation, mass damper 60 can move up and down vertically acting on couplers 62 in shear in a counter-motion since there is sufficient space above and below each coupler 62 within its respective pocket 82. Thus, the vertical up and down bobbing of a particular cutting unit 8 induces an up and down motion in mass damper 60 that is counter to the bobbing direction of cutting unit 8 without such motion being prevented by too tight of a fit between coupler 62 and its receiving pocket 82.

Mass damper 60 also includes a central pocket 83 similar to pockets 82. When mass damper 60 is fully installed on steering head 44, the threaded front end 72 of bolt 66 and the securing nut 78 carried thereon, which structure will be referred to hereafter collectively as the snubbing portion of bolt 66, will be received within central pocket 83 with some clearance being provided between the walls of pocket 83 and the snubbing portion 79 of bolt 66. This is designed to provide a snubbing action that acts as a stop for the vertical motion of mass damper 60 to prevent overstressing the elastomeric couplers 62. For example, if mass damper 60 is subject to a vertical force strong enough that the resultant displacement of mass damper would damage couplers 62, the snubbing portion of bolt 66 engages against the top or bottom walls of central pocket 83, depending on the direction of the force, to prevent any further vertical motion of mass damper 60 at a point before couplers 62 that would be damaged by overstressing.

Finally, the attachment of mass damper 60 to couplers 8 is accomplished by passing threaded shafts 84 extending from front faces of couplers 62 through various countersunk openings 86 in a front face of mass damper 60. A plurality of nuts 88 are then used on threaded shafts 84 to secure mass damper 60 to couplers 62. See FIG. 8 which shows mass damper 60 having been received on the threaded front shafts 84 of couplers 62 but prior to the tightening of nuts 88. FIG. 10 shows mass damper 60 in place with the attachment bolts 88 having been installed and tightened.

The Applicants have discovered that in mower 2 equipped with three reel cutting units 8 the frequency of the up and down bobbing of cutting units 8 is fairly consistent at approximately 7.5 to 8 hertz regardless of the type of grass or turf being mowed. The Applicants have further found that one example of an effective mass damper 60 for this frequency will weigh approximately 24 lbs. for a reel cutting unit 8 weighing approximately 80 to 100 lbs. using elastomeric couplers 62 made of natural rubber having a durometer of 40 on the Shore A scale. Of course, these values may change for cutting units of different mass or for cutting units experiencing different bobbing frequencies. In this case, the following equation applies:

$$F=\sqrt{K/M}$$

where F=frequency to be damped, K=spring constant of the elastomeric coupler 62 and M=mass of mass damper 60.

Referring to FIG. 11, one pitch arm 54 is shown having a circular hub 90 that is received on an inwardly protruding hub 92 on one side plate of cutting unit frame 12 with a cylindrical bearing 94 being interposed therebetween. An identical arrangement is used for pitch arm 54 on the other side of cutting unit 8. This journaling of pitch arms 64 is what provides for the pitching action of cutting unit 8 relative to suspension 30 about the rotational axis x of reel 14. The Applicants discovered that the radial clearance indicated as r between the inner diameter of pitch hub 90 and the outer diameter of bearing 94 should be very small, preferably approximately 10 thousandths of an inch or less, and preferably about 7 thousandths of an inch, to eliminate excessive slop between cutting unit 8 and the lift and lower portion 31 of suspension 30. With this very small radial clearance, cutting unit 8 and the lift and lower portion 31 of suspension act dynamically as a single unit with respect to forces creating vertical bobbing of cutting unit 18. This radial clearance tightness between hub 90 and cylindrical bearing 94 was discovered by the Applicants to allow mass damper 60 to react to and damp such bobbing motion much more effectively than when substantially looser radial clearances, i.e. the 45 to 90 thousandths of an inch found in the pitch arms of Toro's prior art TriFlex Riding Greensmower, were tried.

The tuned mass damper of this invention can conveniently be provided in kit form comprising mass damper 60, coupling plate 64, the elastomeric couplers 62 having the outwardly extending threaded shafts 80 and 84 integrally encapsulated therein, nuts 88 for securing the threaded shafts of each elastomeric coupler 62 to coupling plate 64 and to mass damper 60, respectively, and the bolt 66 and nut 78 for securing coupling plate 64 to the front face of steering head 44. This would allow only those users of mowers who experience an undesirable bobbing to purchase and install mass dampers 60 to lessen or substantially eliminate such bobbing. Alternatively, mass dampers 60 may be pre-installed on mower 2 as part of the original manufacture thereof.

In order to retain the functionality of being able to temporarily retain motor 18 of a cutting unit when such motor has been removed from cutting unit 8, the front face of mass damper 60 is provided with a smooth central bore and a splined insert 96 that is a substantial duplicate of the central bore 74 and splined insert 75 in steering head 44. Thus, even when mass damper 60 is installed on steering head 44, the splined drive shaft 20 of the removed motor 18 is still insertable into the splined insert 96 on mass damper 60, rather than on the now covered insert 75 of steering head 44, to allow the same convenient storage of the removed motor 18 when cutting unit 8 is detached and removed from suspension 30.

Various modifications of this invention other than those described above would also be apparent to those of ordinary skill in the art. For example, rather than reel cutting units carried in a gang configuration on frame 4 of mower 2, a plurality of rotary cutting decks may instead be carried thereon. Each rotary cutting deck has a cutting chamber that is open at the bottom and that faces the ground with one or more substantially horizontal cutting blades contained in the cutting chamber. The cutting blades rotate about substantially vertical axes in substantially horizontal cutting planes to sever the grass through impact with sharpened cutting edges of the cutting blades. The rotary cutting decks are typically carried on a suspension having a lift and lower portion and a ground contour following portion that permits the deck to move about at least a pitch or a roll axis or both relative to the lift and lower suspension portion. A suitably sized mass damper movable vertically to act in shear on one or more elastomeric couplers may be placed somewhere in the suspension within the ground contour following portion or adjacent to the connection between the ground contour following portion and the lift and lower portion to damp the frequency of the up and down bobbing exhibited by such rotary cutting decks.

Accordingly, this invention is not to be limited to the details of the embodiments disclosed herein, but only by the appended claims.

The invention claimed is:

1. A mower, which comprises:
   (a) a plurality of grass cutting units arranged in a gang configuration on a movable frame, wherein the grass cutting units are reel cutting units or rotary cutting decks;
   (b) a separate suspension carrying each grass cutting unit and separately connecting each grass cutting unit to the frame, wherein each suspension includes a lift and lower suspension portion for lifting and lowering the cutting unit out of and into contact with the ground, respectively and a ground contour following suspension portion permitting the cutting unit to have at least two degrees of freedom of motion relative to the lift and lower suspension portion to permit the cutting unit to independently follow the ground contours the cutting unit encounters in a grass cutting mode of operation; and (c) at least one tuned mass damper installed in and directly mounted to the ground contour following suspension portion of each suspension for damping undesired vertical bobbing of the cutting unit, wherein the at least one tuned mass damper when installed in and directly mounted to the ground contour following suspension portion is free of direct mounting to the lift and lower suspension portion and is free of direct mounting to the cutting unit carried by each suspension.

2. The mower of claim 1, wherein the at least one tuned mass damper is carried by the ground contour following suspension portion of each suspension forwardly of the cutting unit carried by each suspension.

3. The mower of claim 1, wherein the at least one tuned mass damper is movably attached to a substantially vertical, substantially flat and laterally extending mounting surface provided on the ground contour following suspension portion.

4. The mower of claim 1, further including at least one elongated resilient coupler that extends horizontally in a fore-and-aft direction to movably attach the at least one tuned mass damper to the ground contour following suspension portion.

5. The mower of claim 1, further including at least three elongated, horizontally extending resilient couplers with the couplers individually being spaced either laterally and/or vertically from one another, wherein the couplers collectively movably attach the at least one tuned mass damper to the ground contour following suspension portion to allow the at least one tuned mass damper to move vertically upwardly and downwardly relative to the cutting unit in a vertical counter motion that damps the undesired bobbing motion of the cutting unit.

6. The mower of claim 5, wherein the at least one tuned mass damper has a plurality of pockets each of which receives and substantially encloses one coupler, wherein each pocket is vertically oversized relative to the coupler received therein to provide sufficient room above and below the coupler to permit adequate vertical counter motion of the at least one tuned mass damper.

7. The mower of claim 6, further including a snubber acting between the at least one tuned mass damper and the ground contour following suspension portion to limit the vertical counter motion of the at least one tuned mass damper to a predetermined amount.

8. The mower of claim 5, wherein the couplers are made of elastomeric material.

9. The mower of claim 1, wherein the at least one tuned mass damper comprises a single tuned mass damper.

10. The mower of claim 9, wherein the single tuned mass damper is centered on a longitudinal centerline of the cutting unit and has substantially less lateral width than a lateral width of the cutting unit.

11. The mower of claim 9, wherein the single tuned mass damper has a fitting into which a shaft of a motor used to power the cutting unit may be inserted to temporarily hold the motor when the motor is removed from the cutting unit.

12. A mower for cutting grass, which comprises:

(a) a frame supported for movement over the ground by a plurality of wheels, wherein at least one of the wheels is powered by a prime mover carried on the frame for causing the frame to be self-propelled, the frame having a support for carrying an operator thereon during a grass mowing operation;

(b) a plurality of grass cutting units carried on the frame in a gang configuration such that the cutting units collectively cut a swath of grass that is wider than a swath of grass cut by any one cutting unit;

(c) a plurality of suspensions extending between the frame and the cutting units for connecting the cutting units to the frame such that the cutting units are propelled over the ground by the self-propulsion of the frame over the ground, wherein one suspension is provided for each cutting unit, and wherein each suspension comprises:

(i) a pivotal lift and lower suspension portion attached to the frame for raising the cutting unit above the ground to place the cutting unit into a transport position in which the frame may be driven from place to place without cutting grass and for lowering the cutting unit into contact with the ground to permit the cutting unit to cut grass in the grass mowing operation; and (ii) a ground contour following suspension portion connecting the lift and lower suspension portion to the cutting unit to permit the cutting unit to move relative to the lift and lower suspension portion to adapt to ground contours independently of the frame, wherein the ground contour following suspension portion includes a steering head that is directly attached to the lift and lower suspension portion to permit the steering head and the cutting unit to pivot about a substantially vertical yaw axis relative to the lift and lower suspension portion; and (d) a mass damper attached to and movably carried by the steering head of the ground contour following suspension portion of each suspension for vertical upward and downward motion relative to each suspension which mass damper motion is counter to and damps an upward and downward harmonic bobbing motion of the cutting unit experienced by the cutting unit during the grass mowing operation.

13. The mower of claim 12, wherein each cutting unit comprises a reel cutting unit or a rotary cutting deck.

14. The mower of claim 12, wherein the mass damper is located adjacent the substantially vertical yaw axis between the steering head of the ground following suspension portion and the lift and lower suspension portion.

15. The mower of claim 14, wherein the mass damper is located forwardly of the substantially vertical yaw axis between the steering head of the ground following suspension portion and the lift and lower suspension portion taken with respect to a forward direction of motion of the frame.

16. The mower of claim 12, wherein the ground contour following suspension portion permits the cutting unit to move relative to the lift and lower suspension system about two additional axes of rotation comprising a longitudinal horizontal roll axis and a lateral horizontal pitch axis.

17. The mower of claim 12, wherein the steering head has a front face and the mass damper is attached to and extends forwardly from the front face of the steering head.

18. The mower of claim 17, wherein the mass damper has a shape that substantially conforms to a shape of the front face of the steering head.

19. The mower of claim 12, wherein the steering head is connected to a frame of the cutting unit by a plurality of pivotal links or arms that permit further pivotal motion of the cutting unit about a longitudinal horizontal roll axis and a lateral horizontal pitch axis relative to the lift and lower suspension portion.

20. A mower, which comprises:
(a) a plurality of grass cutting units arranged in a gang configuration on a movable frame, wherein the grass cutting units are reel cutting units or rotary cutting decks;
(b) a separate suspension carrying each grass cutting unit and separately connecting each grass cutting unit to the frame, wherein each suspension includes a lift and lower portion for lifting and lowering the cutting unit out of and into contact with the ground, respectively, and a ground contour following portion to permit the cutting unit to independently follow the ground contours the cutting unit encounters in a grass cutting mode of operation, wherein the ground contour following suspension portion includes a pair of laterally spaced pitch arms having hubs that are pivotally journalled by laterally spaced cylindrical members on the grass cutting unit to permit the cutting unit to pivot or rock about a substantially horizontal, laterally extending pitch axis, and wherein a radial clearance between the hub of each pitch arm and the cylindrical member which journals each pitch arm is approximately ten thousandths of an inch or less; and
(c) at least one tuned mass damper installed in each suspension for damping undesired vertical bobbing of the cutting unit.

* * * * *

UNITED STATES PATENT AND TRADEMARK OFFICE
CERTIFICATE OF CORRECTION

PATENT NO. : 10,537,059 B2
APPLICATION NO. : 15/694778
DATED : January 21, 2020
INVENTOR(S) : Corey J. Muellenbach et al.

Page 1 of 1

It is certified that error appears in the above-identified patent and that said Letters Patent is hereby corrected as shown below:

In the Claims

Column 9, Line 3, insert a --,-- after the word "respectively".

Signed and Sealed this
Twenty-fifth Day of February, 2020

Andrei Iancu
*Director of the United States Patent and Trademark Office*